6 Sheets—Sheet 1.
C. J. F. WILKINS.
Combined Harvester and Thrasher.
No. 225,449. Patented Mar. 9, 1880.
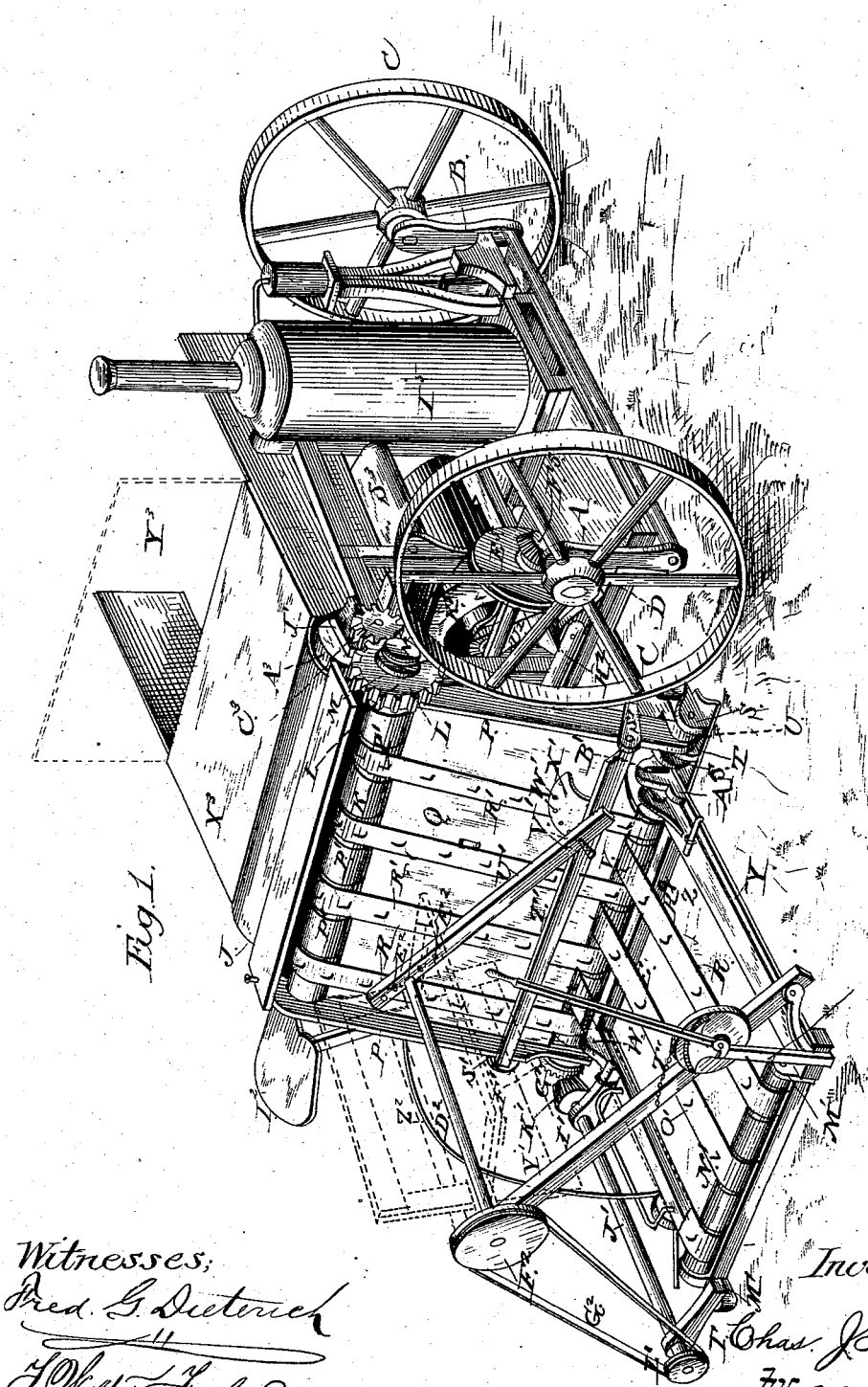

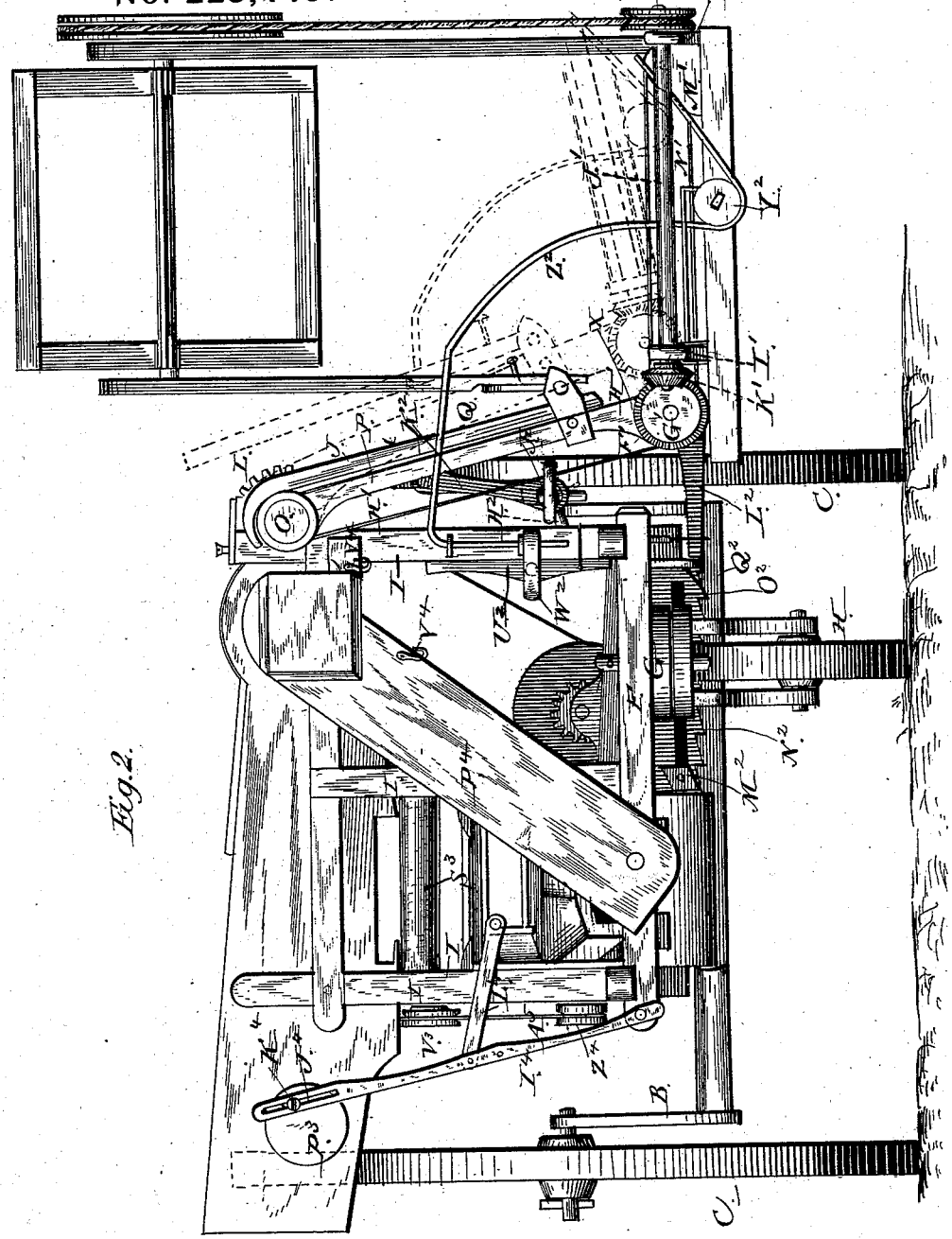

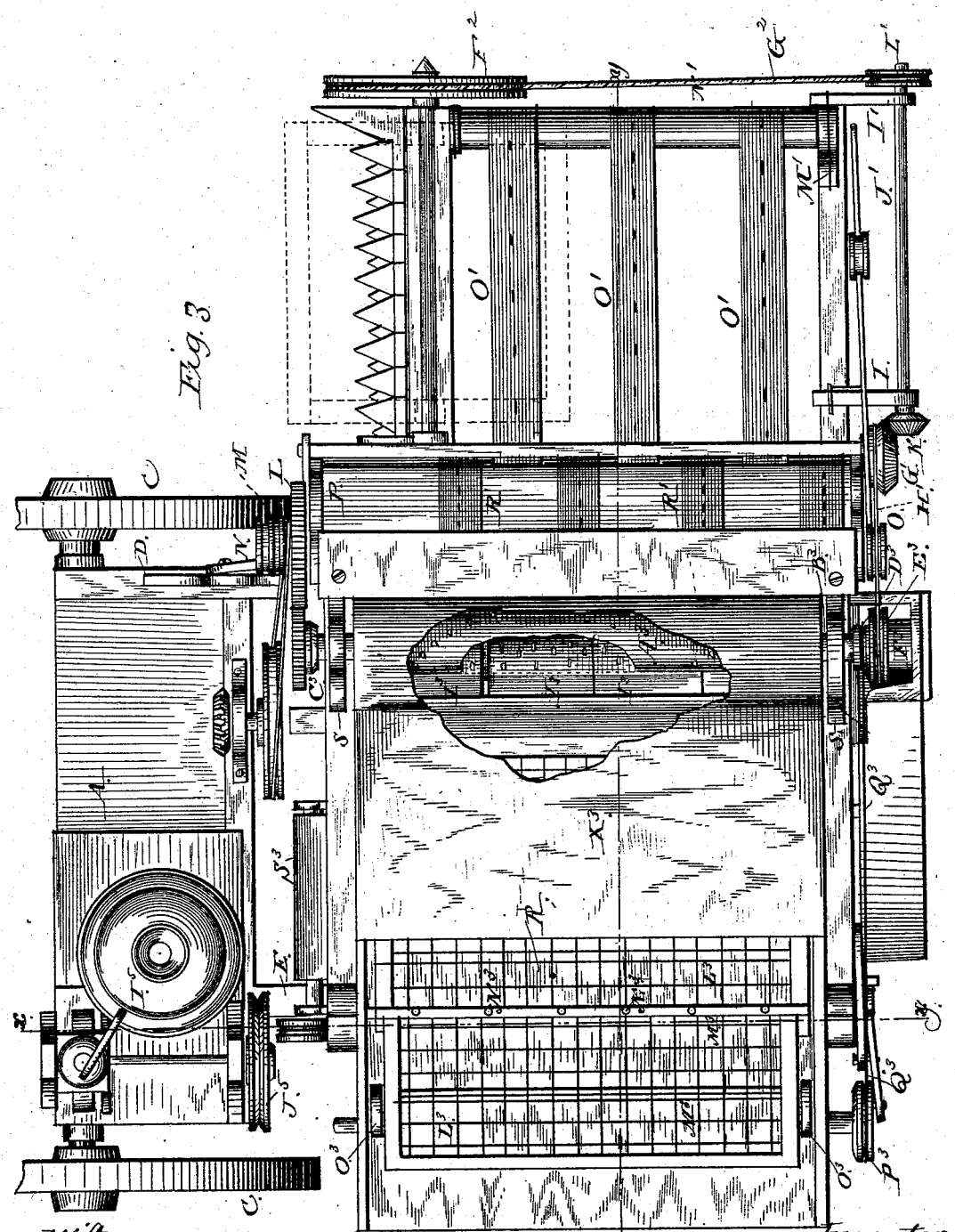

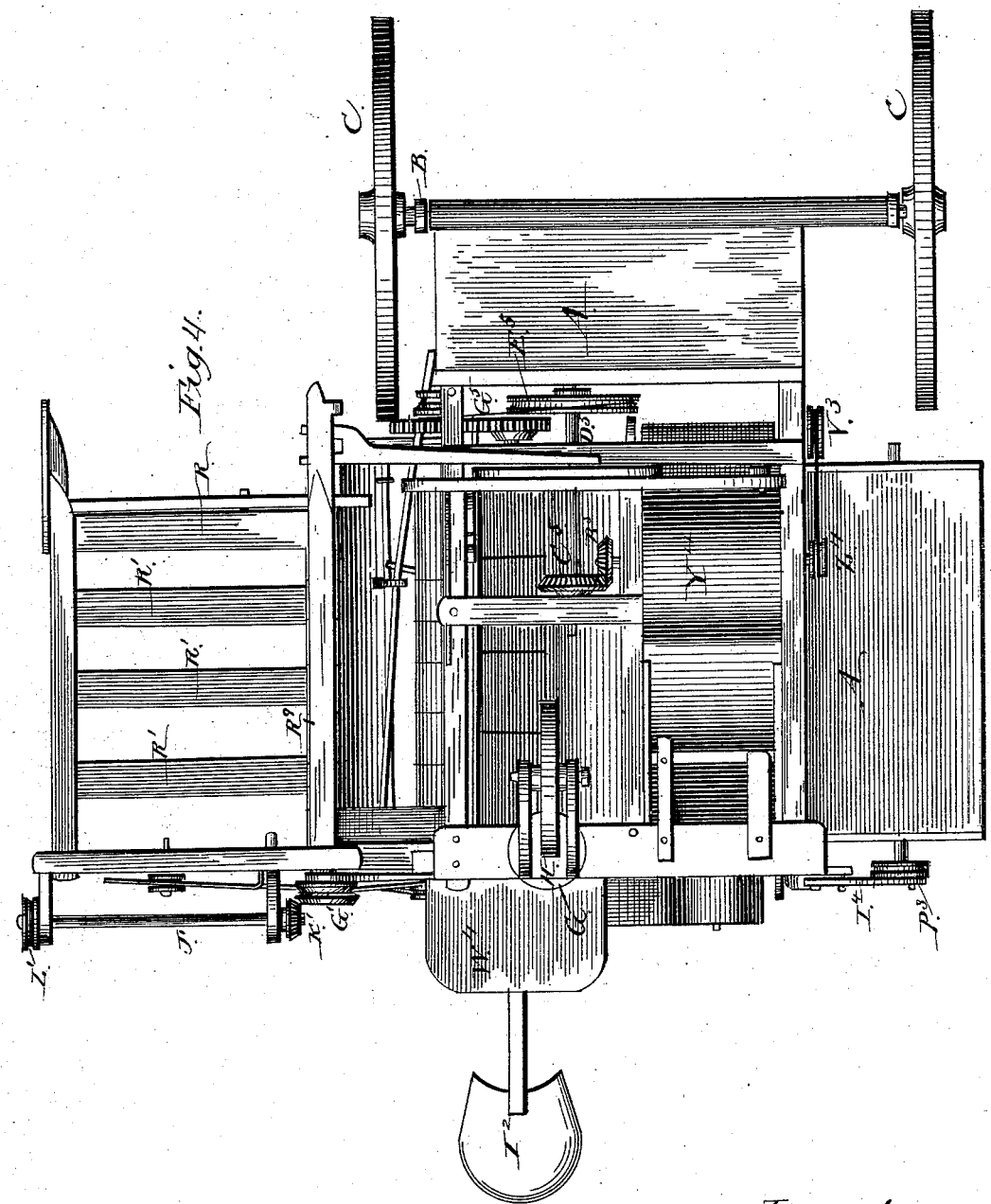

C. J. F. WILKINS.
Combined Harvester and Thrasher.
No. 225,449. Patented Mar. 9, 1880.
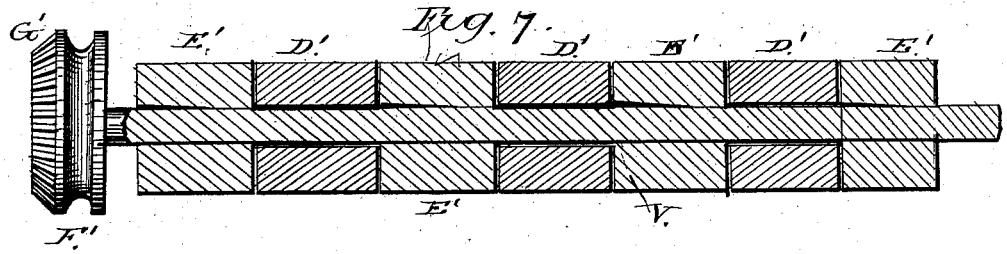
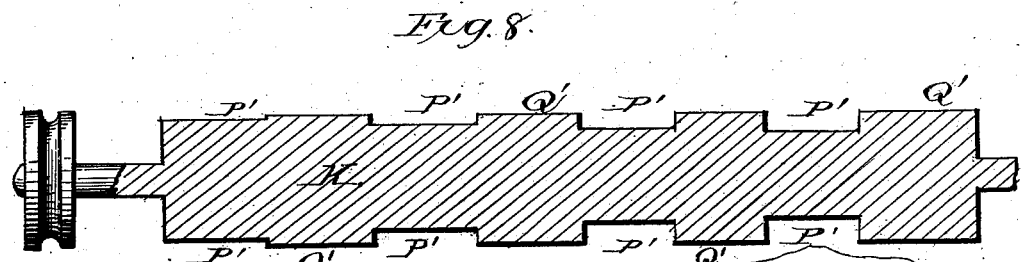
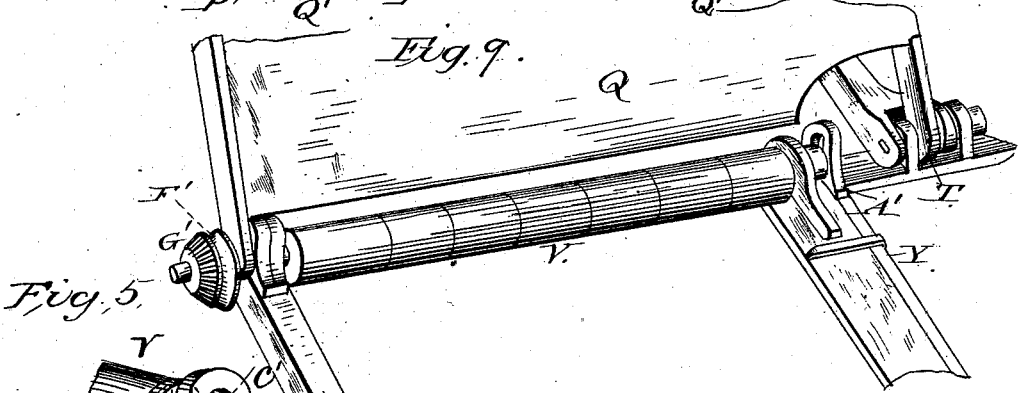
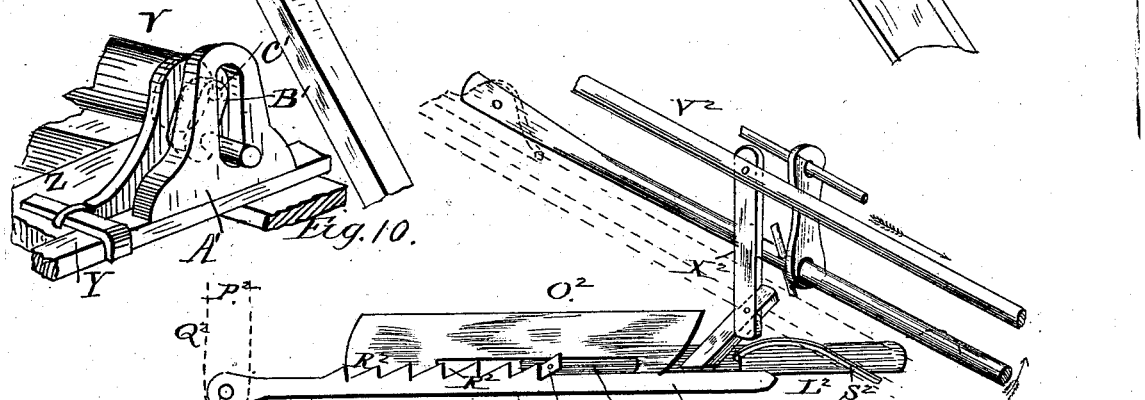

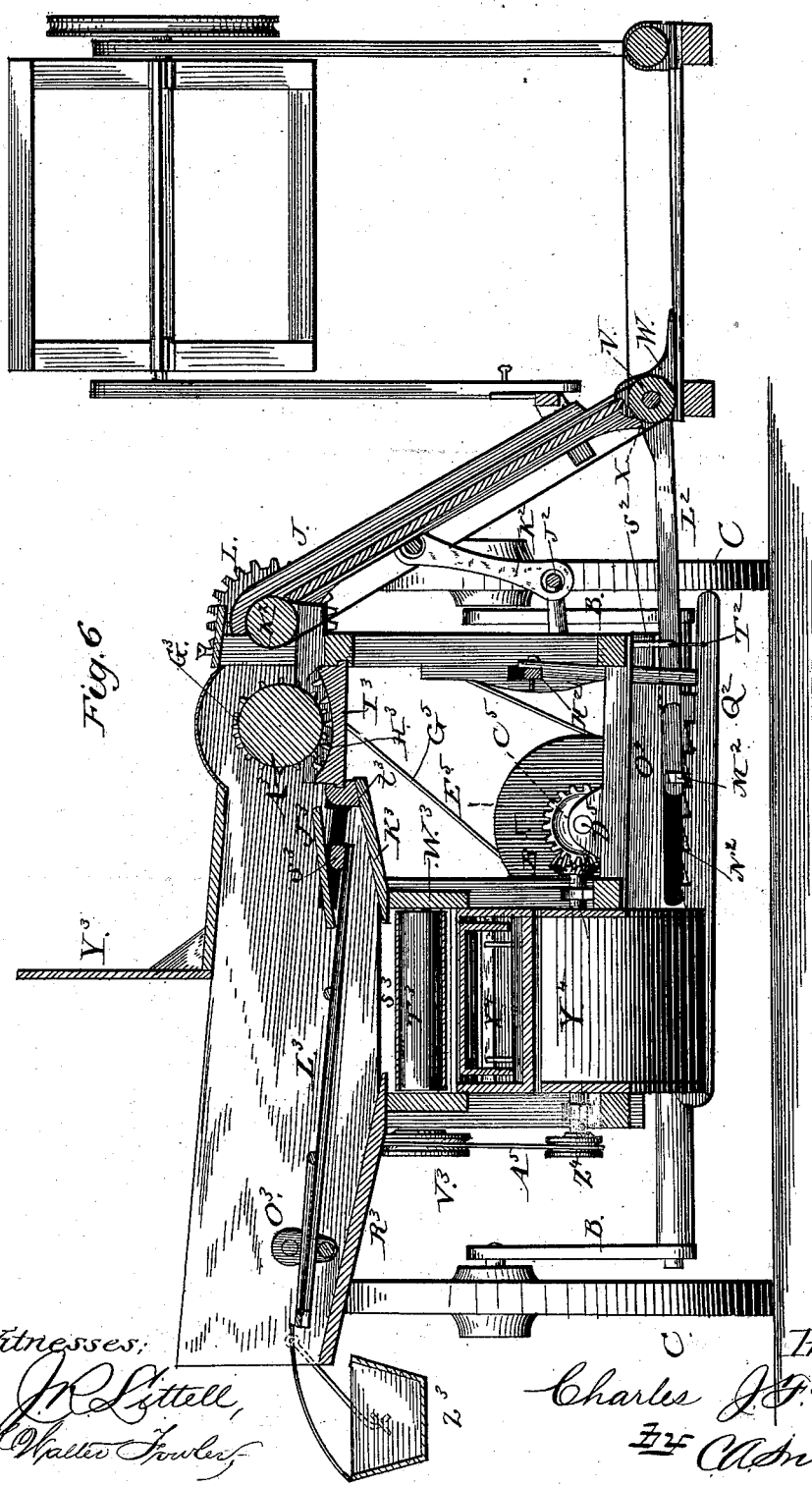

UNITED STATES PATENT OFFICE.

CHARLES J. F. WILKINS, OF WINDSOR, NOVA SCOTIA, CANADA.

COMBINED HARVESTER AND THRASHER.

SPECIFICATION forming part of Letters Patent No. 225,449, dated March 9, 1880.

Application filed June 28, 1879.

*To all whom it may concern:*

Be it known that I, CHARLES J. F. WILKINS, of Windsor, in the Province of Nova Scotia and Dominion of Canada, have invented certain new and useful Improvements in Combined Harvester and Thrashing-Machine; and I do hereby declare that the following is a full, clear, and exact description of the invention, which will enable others skilled in the art to which it appertains to make and use the same, reference being had to the accompanying drawings, which form a part of this specification.

Figure 1 is a front view in perspective. Fig. 2 is a rear elevation, the dotted lines indicating the position of the grain-platform when elevated. Fig. 3 is a top plan. Fig. 4 is a bottom plan. Fig. 6 is a sectional view on the line $x$ $x$, Fig. 3. Fig. 5 is a detail view, showing the mechanism for operating the cutter-bar. Fig. 7 is a longitudinal section of the grain-platform roller-shaft. Fig. 8 is a longitudinal section of the elevating-platform roller-shaft. Fig. 9 is a detail view, in perspective, of one end of the grain and elevating platforms, showing the method of connecting the said platforms together and to the machine; and Fig. 10 is a detail view of the mechanism for raising and lowering the grain-platform.

Corresponding parts in the several figures are denoted by like letters of reference.

This invention relates to an improved combined harvesting and thrashing machine; and it consists in the improved construction and combination of the working parts of the machine, which will be hereinafter fully described, and particularly pointed out in the claims.

In the drawings hereto annexed, A represents the front platform, which is supported upon a crank-axle, B, carried by the transporting-wheels C C. The sides D D of the platform A extend rearwardly, so as to form the main supporting-frame E, the rear cross-piece of which, F, is provided with a turn-table, G, for a swiveled or caster wheel, H, upon which and the transporting-wheels C C the machine is supported. Suitable uprights I I, rising from the main frame E, form the body of the frame of the thrashing-machine or grain-separator, which latter may be said to be built or arranged transversely upon the main frame, the cylinder being longitudinal with said frame. The front end of the thrashing-machine is therefore naturally at the side of the machine, and necessarily at the side to which the reaping mechanism is attached.

The reaper consists, besides the reel, cutting, and operating mechanisms, of two essential parts—viz., the grain platform or table and what I term the "elevating-platform." The construction and arrangement of these parts are as follows:

The upper sides of the front end of the thrashing-machine frame are provided with two brackets, J J, forming bearings for a shaft, K, the front end of which is provided with a gear-wheel, L, and a double pulley, M N. The rear end has a single pulley, O. Upon the ends of the shafts are journaled the sides P P of the elevating-platform Q. R is the grain-platform, which consists, essentially, of a quadrangular frame, the inner side piece of which, $R^9$, is provided at its front end with brackets S S, holding a rod, T, by which it is journaled or hinged to a bracket, U, formed by the lower end of the forward side piece of the elevating-platform. The roller-shaft V of the grain-platform is journaled in bearings W W upon the inner side piece, $R^9$, of said platform, and its rear end is also journaled in a bracket, X, formed by the lower end of the rear side piece of the elevating-platform.

It will thus be seen that by the rod T and by the rear end of shaft V the grain-platform is hinged to the elevating-platform.

The cutter-bar Y, which may be of any suitable construction, reciprocates in suitable bearings upon the front cross-piece, Z, of the grain-platform. At its inner end it is provided with an upright, A', having a vertical slot, B'. The front end of the shaft V is provided with a crank, C', working in said slot, thus imparting to the cutter-bar the reciprocating motion by which the grain is cut. The roller-shaft V is provided with a series of cylindrical sleeves or rollers, every other one of which, D', is loose, while the alternating ones, E', are keyed firmly upon the shaft. At its rear end the latter is provided with a pulley, F', the outer end of which is toothed to form a bevel-wheel, G'; or the latter may be separate, if desired. A belt or band, H', connects the pulley F' with the pulley O upon shaft K. Two brackets, I' I', extending rearwardly from the grain-platform, have bearings for a shaft, J', provided at one end with a bevel-wheel, K', engaging with the bevel-wheel G' upon shaft V. At its other (outer) end it has a pulley or band wheel, L'.

Brackets M' M', projecting upwardly from the outer side piece of the grain-platform, form bearings for a cylindrical shaft, N'. Broad flat belts or bands O' run upon the solid cylinders E' of shaft V and upon the shaft N', as shown, said belts or bands forming the floor of the grain-platform. A solid bottom of boards or other material may be provided, but is not essential.

The shaft K of the elevating-platform is, primarily, cylindrical in shape; but upon it are turned a series of annular grooves of equal width, which said grooves increase in depth from the rear to the front end of the shaft. The spaces between the grooves are equal to the width thereof. The shaft thus grooved forms practically a series of pulleys, P' P', of decreasing size from the rear to the front, and with intermediate spaces, Q'. Broad belts or bands R' are adjusted upon the pulleys P' and the loose pulleys or rollers D' upon shaft V, and said belts or bands form the elevator, which carries the grain to the thrashing-cylinder. They should, in order to perform this duty efficiently, be provided with teeth or fingers, which will prevent the grain from slipping, and similar fingers may, if desired, be provided upon the bands forming the floor of the grain-platform.

The front and rear side pieces of the elevating-platform are provided with brackets S', forming bearings for a rock-shaft, T', to the side of which is pivoted an upwardly-projecting arm, U', which is capable of being adjusted forwardly to any desired inclination, in which it may be held by a pin, V', passing through said arm and through one of a series of perforations, W', in a segmental plate, X', secured upon and projecting upwardly from the shaft T'. Y' is an upwardly-projecting arm pivoted to the outer side of the grain-platform and adjustable forward or rearward to any desired position, where it may be held by a pin passing through it and one of a series of perforations arranged segmentally in an upward and rearward projection of the outer finger or swath guard. The shaft $D^2$ of the reel is adjustable in any two of the perforations or bearings $E^2$ at the upper ends of the arms U' Y', and said shaft is provided at its outer end with a pulley, $F^2$, connected by a band or belt, $G^2$, with the pulley L' upon shaft J', through which the usual rotary motion is thus imparted to the reel.

It will be observed from the foregoing that the reel is not only adjustable vertically, but also forwardly to any desired position, thus enabling high or low grain to be handled with equal facility. The band $G^2$ can be readily lengthened or shortened to suit any position of the reel.

$H^2$ is an arm pivoted to the side of the front or main platform, A, and projecting rearwardly to within convenient reach of the driver, whose seat, $I^2$, is suitably adjusted to the rear of the machine-frame. The arm $H^2$ passes through a loop, $J^2$, in the lower end of an arm, $K^2$, hinged or pivoted to the under side of the elevating-platform.

$L^2$ is an arm hinged upon the rod T, (by which the grain-platform is hinged to the elevating-platform,) and projecting laterally under the machine-frame, it being provided with a stud, $M^2$, which slides in a horizontal slot, $N^2$, formed in a plate, $O^2$, attached to the rear side of the forward cross-piece of the machine-frame.

To a bracket, $P^2$, projecting downwardly from the outer side, D, of the frame is pivoted an arm, $Q^2$, having a series of notches, $R^2$, arranged to engage the stud $M^2$, a spring, $S^2$, being arranged under the inner side piece, D, of the frame, and connected by a chain or rope, $T^2$, with the free end of the notched arm $Q^2$ in such a manner as to force it upwardly for engagement with the stud $M^2$, as described.

In suitable bearings $U^2$ $U^2$ upon the uprights I of the machine-frame slides a rod, $V^2$, the rear end of which is provided with a cross piece or plate, $W^2$, by which it may be conveniently operated by pressure of the driver's foot. The forward end of the rod $V^2$ is pivoted to the upper arm of a bell-crank lever, $X^2$, the fulcrum of which is upon the inside of the inner side beam, D, of the frame. The lower arm of said lever bears down against the free end of the pivoted notched bar $Q^2$.

When it is desired to elevate the grain-platform, with its cutter-bar attachment, for the purpose of cutting the grain "high," this may be done by lifting the rear end of the pivoted bar $H^2$. This, through the hinged arm $K^2$, lifts the elevating-platform and forces it in an outward direction, thus raising the grain-platform, which, as above stated, is hinged to its lower end.

The rear end of the grain-platform has a roller or pulley, $Y^2$, adapted to slide upon an inclined rod or bracket, $Z^2$, projecting from the side of the machine-frame, and so shaped that upon it the grain-platform will remain supported in a level position at any elevation.

It will be seen that by raising the elevating-platform the arm $L^2$ is drawn out, causing its stud $M^2$ to engage one of the notches in arm $Q^2$, by which it is retained in any position in which it may be placed.

To lower the platform it is only necessary to exert pressure upon the rear end of the sliding rod $V^2$. This will cause the lower arm of the bell-crank lever $X^2$ to bear down against the free end of the notched arm $Q^2$, thus releasing it from the stud $M^2$ of arm $L^2$ and permitting the platforms to drop down.

From the foregoing the arrangement of the platforms, the mechanism for raising and lowering the same, and the operation of the reel and cutting mechanism will be readily understood. When the grain falls upon the grain-platform, (with the heads toward the rear end of said platform,) the bands O', which form the floor of said platform, will carry it toward the elevating-platform, where it is taken by the belts R', forming the elevator. Now, owing to the differently-sized pulleys P' P', of which the rear ones, as above stated, are the largest, the rear belts, R', will move with greater speed than the front ones, the consequence of which is, that the heads of the grain, being at the rear end, are carried upward more rapidly than the stalks, the result of which is, that the cut grain is put into the machine "heads first," the advantage of which is well understood.

It is evident that the sizes of the pulleys and other means for transmitting motion, all of which have been fully described, may be so adjusted as to give to each part its proper speed; also, that other means than the particular ones described may be used without changing the nature of my invention.

In order to insure the perfect and satisfactory operation of all the parts of this machine, I have found it desirable, under certain circumstances even necessary, that some other motive power than that used for transporting the machine should be used for operating its working parts. For economical reasons this is equally desirable, for while only two or three horses are necessary to transport the machine, at least twice that number would be required to operate it in the field. I therefore provide a suitable mechanical motor, as to the kind or species of which I do not wish to be understood as limiting myself, although a small but sufficiently powerful steam-engine might be preferable. Such motor, which in the drawings is denoted by I$^5$, I arrange upon the front platform, A, which will also conveniently support an attendant, if necessary. The drive-wheel J$^5$ of the motor is connected by a belt, K$^5$, with the pulley N upon the main shaft K, through which motion is thus transmitted to the working parts of the machine.

From the foregoing description the operation and advantages of my invention will be readily understood. It performs the labor of harvesting and thrashing the grain speedily, efficiently, and with but little expense. It is simple, compact, and durable.

Having thus described my invention, I claim and desire to secure by Letters Patent of the United States—

1. The combination, in a combined harvesting and thrashing machine, of the elevating-platform hinged to the front end of the thrashing-machine parallel to the cylinder, with the grain-platform hinged to the lower end of said elevating-platform, so as to be vertically adjustable, as set forth.

2. The vertically-adjustable grain-platform having at its rear end a roller-bracket, in combination with an inclined rod or bracket rigidly attached to the frame of the machine, and adapted to support at any desired elevation the rear end of the grain-platform, as set forth.

3. The combination, with the hinged elevating-platform having the hinged grain-platform, of the rock-shaft T', having pivoted adjustable arm U', pivoted adjustable arm Y', and the reel journaled in the upper ends of said adjustable arms, as set forth.

4. The combination, in a combined harvesting and thrashing machine, of the hinged elevating-platform having the hinged vertically-adjustable grain-platform, the cylinder-shaft K, having a series of grooves forming pulleys of decreasing size from rear to front, the shaft V, having a series of alternating fixed and loose rollers, cylindrical shaft N', bands O', running upon shaft N' and upon the fixed pulleys of shaft V, bands R', running upon the loose pulleys of shaft V and upon the differently-sized pulleys of shaft K, and suitable mechanism for operating the said parts, as set forth.

5. In a combined harvesting and thrashing machine, the combination, with the hinged elevating-platform and the vertically-adjustable grain-platform hinged thereto, of the hinged arm K$^2$, having loop J$^2$, pivoted rod H$^2$, hinged arm L$^2$, having stud M$^2$, pivoted notched arm Q$^2$, spring S$^2$, sliding rod V$^2$, and bell-crank lever X$^2$, all arranged and operating as described, for the purpose set forth.

In testimony that I claim the foregoing as my own I have hereto affixed my signature in presence of two witnesses.

CHARLES JAMES FORMAN WILKINS.

Witnesses:
JEDIDIAH ANTHONY SHAW,
THOMAS AYLWARD.